US012662819B2

(12) United States Patent
Roche

(10) Patent No.: US 12,662,819 B2
(45) Date of Patent: Jun. 23, 2026

(54) ROOF MEMBRANE WITH A FOLDED RELEASE LINER

(71) Applicant: Griff and Associates, L.P., Fallsington, PA (US)

(72) Inventor: Timothy Roche, Bristol, PA (US)

(73) Assignee: GRIFF AND ASSOCIATES, L.P., Fallsington, PA (US)

( * ) Notice: Subject to any disclaimer, the term of this patent is extended or adjusted under 35 U.S.C. 154(b) by 574 days.

(21) Appl. No.: 18/150,986

(22) Filed: Jan. 6, 2023

(65) Prior Publication Data

US 2024/0229467 A1     Jul. 11, 2024

(51) Int. Cl.
*E04D 5/14*          (2006.01)
*B32B 7/06*          (2019.01)
*B32B 7/12*          (2006.01)

(52) U.S. Cl.
CPC ............... *E04D 5/148* (2013.01); *B32B 7/06* (2013.01); *B32B 7/12* (2013.01); *B32B 2419/06* (2013.01)

(58) Field of Classification Search
CPC .. E04D 5/148; B32B 7/06; B32B 7/12; B32B 2419/06
See application file for complete search history.

(56) References Cited

U.S. PATENT DOCUMENTS

| | | | | |
|---|---|---|---|---|
| 2,721,550 A | * | 10/1955 | Banff .................. | A61F 13/0203 206/441 |
| 2,725,322 A | * | 11/1955 | Muttera, Jr. ............... | C09J 7/20 156/247 |
| 2,969,872 A | * | 1/1961 | Chambers ............... | A61F 13/02 206/441 |
| 2,973,859 A | * | 3/1961 | Schladermundt ... | A61F 13/0203 206/441 |
| 3,642,564 A | | 2/1972 | Walker et al. | |
| 4,176,664 A | * | 12/1979 | Kalish ................. | A61F 13/0203 604/290 |
| 4,374,687 A | | 2/1983 | Yamamoto | |
| 4,598,004 A | * | 7/1986 | Heinecke .............. | A61F 13/023 428/41.5 |
| 4,614,183 A | * | 9/1986 | McCracken .......... | A61M 25/02 602/57 |
| 4,623,568 A | | 11/1986 | Suzuki | |
| 4,928,680 A | * | 5/1990 | Sandbank ............. | A61F 13/023 602/57 |
| 5,074,293 A | * | 12/1991 | Lott ....................... | A61F 13/023 602/57 |
| 5,153,040 A | * | 10/1992 | Faasse, Jr. .............. | A61L 15/26 428/41.5 |

(Continued)

FOREIGN PATENT DOCUMENTS

| | | | | |
|---|---|---|---|---|
| GB | 2128479 A | * | 5/1984 | ............. A61L 15/58 |

*Primary Examiner* — Patricia L. Nordmeyer
(74) *Attorney, Agent, or Firm* — Sand, Sebolt & Wernow Co., LPA

(57) ABSTRACT

A roof membrane has two release liners that meet at a split seam. One of the release liners has an integral pull tab formed by a fold. The pull tab enables that release liner to be easily pulled from the adhesive on the second surface of the roof membrane. The fold may define a living hinge that causes the pull tab to be biased form a folded position to an extended position when the first release liner that overlaps the second release liner is removed or peeled off of the roof membrane.

13 Claims, 6 Drawing Sheets

(56)                    References Cited

U.S. PATENT DOCUMENTS

| | | | | |
|---|---|---|---|---|
| 5,628,724 | A * | 5/1997 | DeBusk | A61F 13/023 |
| | | | | 206/440 |
| 5,733,251 | A * | 3/1998 | Johns | A61F 13/023 |
| | | | | 602/57 |
| 5,916,654 | A | 6/1999 | Phillips et al. | |
| 6,008,429 | A * | 12/1999 | Ritger | A61F 13/0256 |
| | | | | 602/57 |
| 6,464,821 | B1 | 10/2002 | Phillips et al. | |
| 6,719,137 | B2 * | 4/2004 | Dotta | A61F 13/0276 |
| | | | | 206/440 |
| 2009/0320987 | A1 * | 12/2009 | Hubbard | B32B 15/14 |
| | | | | 428/354 |
| 2010/0307087 | A1 * | 12/2010 | Zoellner | E04D 12/002 |
| | | | | 52/309.3 |

* cited by examiner

ROOF MEMBRANE WITH A FOLDED RELEASE LINER

TECHNICAL FIELD

This disclosure is directed generally to a release liner configuration at a split seam on a roof membrane.

BACKGROUND ART

Flat or low slope roofs provide years of low cost, low maintenance performance. Flat or low slope roofs have been a preferred roof covering for commercial, institutional and industrial buildings for years because of their ability to protect against the elements, to allow water to drain away from the roof surface, and to keep building contents and occupants dry and comfortable. The flat or low slope roof may be formed of metal or another material.

Flat or low slope metal roofs often have a corrugated metal base layer that is supported by trusses or other structural supports carried by the building. The corrugated metal is a poor thermal insulator and thus insulation is typically laid over the corrugated metal. The insulation may be any type of insulation, however, in commercial applications, the insulation is often a foam board having a desired R-value, often R-16 or greater. The foam board is usually covered with a waterproof membrane.

Sheets of roofing membrane are commonly used in many industrial and commercial roofing applications wherein large sheets of a waterproof membrane, are overlapped and then heated and pressed together to form a heat weld. These sheets are usually placed over or atop the insulation material on the flat or low slope roof. Alternatively, these sheets of roofing membrane may be applied directly to the flat or low slope roof. These sheets are usually an elastomeric-type of material such as various rubber compositions, or thermoplastic sheets and the like. When done properly this method forms a strong water impervious seam which prevents subsequent peeling apart of the seam and prevents the penetration of water into the roof or insulation material of a structure below the membrane.

U.S. Pat. No. 6,464,821 teaches that these roof membranes are adhesive backed membranes are covered by a releasable backing, commonly referred to as a release liner. The release liner prevents the membrane or sheet from: (1) adhering to itself when the sheet is rolled or stacked; (2) being contaminated during handling; and (3) prematurely adhering to a substrate during application. Characteristics of the release liner are generally determined by the type of adhesive backing applied to the sheet. Typical release liner materials include paper, film, or composite (paper and film) materials. The release liner, whether paper, film, or a composite is typically coated with a release system.

A split release liner includes two or more adjoining pieces of releasable backing or a single piece with perforations that allow the liner to be removed in sections. An applicator (i.e., an operator) can peel off one piece or section of the release liner, leaving other sections of the adhesive protected. After positioning the sheet and applying one section with its exposed adhesive, the applicator can then peel off the remaining section of a release liner and apply that portion. This system reduces the risks of contaminating the exposed adhesive and wrinkling the sheet.

Although the split release liner system has improved the installation of adhesive sheets, problems still exist. A release agent is applied to at least one surface of the release liner, whether the release liner comprises paper, film, or a composite, and that surface contacts the adhesive side of a sheet without bonding. Although the release agent resists bonding to the adhesive, the edges of release liners are typically uncoated so the edges may stick to the adhesive. If a split release liner is made by cutting a single-piece sheet, another uncoated edge is created by the cut. These uncoated edges adhere to the adhesive layer of a membrane or other sheet. When the edges adhere, the release liner is difficult to remove causing portions of the release liner to tear and remain on the adhesive surface. These residual portions prevent full adhesion. If the applicator tries to remove the pieces the sheet may be damaged and may be contaminated.

U.S. Pat. No. 6,464,821 sought to improve on split release liners by providing at least one strip of material placed between the edges of the liner and the adhesive surface. The strip helped prevent the edges of each release liner section from adhering to the underlying sheet making removal easier. However, it has become apparent to Applicant of the present disclosure that there exists a need for improvement inasmuch the manufacturability associated with the strip may increase costs and time.

SUMMARY OF THE INVENTION

Thus, what is needed is an improvement for split release liners for roof membranes that enable the second release liner to be removed from the adhesive backing without adding an additional distinct component, such as the strip as taught in U.S. Pat. No. 6,464,281. The present disclosure addresses this issue by providing an integrally formed pull tab that enables the second release liner to be easily manufactured without adding additional cost of materials and manufacturing time to the production of a split seam release liner roofing membrane.

In one aspect, an exemplary embodiment of the present disclosure may provide a roof membrane comprising: a membrane body that is substantially fluid impermeable to prevent fluid from penetrating through the membrane and the membrane body is adapted to be applied to a roof as a fluid barrier, wherein the membrane body has a first end and a second end defining a longitudinal direction therebetween, a first side and a second side defining a transverse direction therebetween, a major first surface and a major second surface defining a vertical direction therebetween, wherein the longitudinal direction, transverse direction and vertical direction are orthogonal to each other; an adhesive applied to the major second surface of the membrane body; a first release liner having a first side edge and a second side edge, wherein the width of the first release liner is measured in the transverse direction from the first side edge to the second side edge, wherein the width of the first release liner is less than that of the membrane body, the first release liner having a first surface and a second surface, wherein the first surface of the first release liner is releasably attached to the adhesive on the major second surface of the membrane body; a second release liner having a first side edge and a second side edge, wherein the width of the second release liner is measured in the transverse direction from the first side edge to the second side edge, wherein the width of the second release liner is less than that of the membrane body, the second release liner having a first surface and a second surface, wherein the first surface of the second release liner is releasably attached to the adhesive on the major second surface of the membrane body; a pull tab defined by a longitudinally-aligned fold at the second side edge of the second release liner, wherein the pull tab on the second release liner is adapted to be pulled to release the second release liner from the membrane body, wherein the pull tab extends longitudinally from the first end to the second end of the membrane body and the pull tab terminates at a terminal end, wherein a width of the pull tab is measured from the terminal end of the pull tab to the second side edge of the second release liner and the width of the pull tab is in a range from about ½ inch to about 4 inches, wherein the pull tab is substantially rectangular when viewed from below, wherein the terminal end of the pull tab is defined by a tab edge that extends longitudinally from the first end of the membrane body to the second end of the membrane body, wherein the tab edge is parallel to the second side edge of the second release liner and parallel to the first side edge of the first release liner and perpendicular to the first and second ends of the membrane body; and a split seam defined at an overlap of the first side edge of the first release liner and the second side edge of second release liner, wherein at least a portion of the first release liner overlaps the pull tab. This exemplary embodiment or another exemplary embodiment of the present disclosure may further provide that the first side edge of the first release liner is aligned directly vertical with the tab edge such that the first side edge of the first release liner and the tab edge are the same distance from the first side of the membrane body. Alternatively, this exemplary embodiment or another exemplary embodiment of the present disclosure may further provide that the first side edge of the first release liner overhangs the tab edge such that the first side edge of the first release liner is closer to the first side of the membrane body than the tab edge. Further alternatively, his exemplary embodiment or another exemplary embodiment of the present disclosure may further provide that the first side edge of the first release liner is underhung relative to the tab edge such that the first side edge of the first release liner is further from the first side of the membrane body than the tab edge. This exemplary embodiment or another exemplary embodiment of the present disclosure may further provide that the second release liner is formed from a resilient material, the roof membrane further comprising: a living hinge defined by the longitudinally-aligned fold, wherein the resilient material biases the pull tab from a folded position to an extended position when the first release liner is removed from the split seam.

In another aspect, an exemplary embodiment of the present disclosure may provide a method of use for a roof membrane, the method comprising: obtaining a roof membrane, the roof membrane including: a membrane body that is substantially fluid impermeable to prevent fluid from penetrating through the membrane and the membrane body is adapted to be applied to a roof as a fluid barrier, wherein the membrane body has a first end and a second end defining a longitudinal direction therebetween, a first side and a second side defining a transverse direction therebetween, a major first surface and a major second surface defining a vertical direction therebetween, wherein the longitudinal direction, transverse direction and vertical direction are orthogonal to each other; an adhesive applied to the major second surface of the membrane body; a first release liner having a first side edge and a second side edge, wherein the width of the first release liner is measured in the transverse direction from the first side edge to the second side edge, wherein the width of the first release liner is less than that of the membrane body, the first release liner having a first surface and a second surface, wherein the first surface of the first release liner is releasably attached to the adhesive on the major second surface of the membrane body; a second release liner having a first side edge and a second side edge, wherein the width of the second release liner is measured in the transverse direction from the first side edge to the second side edge, wherein the width of the second release liner is less than that of the membrane body, the second release liner having a first surface and a second surface, wherein the first surface of the second release liner is releasably attached to the adhesive on the major second surface of the membrane body; a pull tab defined by a longitudinally-aligned fold at the second side edge of the second release liner, wherein the pull tab on the second release liner is adapted to be pulled to release the second release liner from the membrane body, wherein the pull tab extends longitudinally from the first end to the second end of the membrane body and the pull tab terminates at a terminal end, wherein a width of the pull tab is measured from the terminal end of the pull tab to the second side edge of the second release liner and the width of the pull tab is in a range from about ½ inch to about 4 inches, wherein the pull tab is substantially rectangular when viewed from below, wherein the terminal end of the pull tab is defined by a tab edge that extends longitudinally from the first end of the membrane body to the second end of the membrane body, wherein the tab edge is parallel to the second side edge of the second release liner and parallel to the first side edge of the first release liner and perpendicular to the first and second ends of the membrane body; a split seam defined at an overlap of the first side edge of the first release liner and the second side edge of second release liner, wherein at least a portion of the first release liner overlaps the pull tab.

This exemplary method or another exemplary embodiment of a method may further include the steps of: pulling the first side edge of the first release liner; releasing the first release liner from the membrane body in response to pulling the first side edge of the first release liner; exposing adhesive below a first portion of the second surface of the membrane body; applying the first portion of the second surface of the membrane body to a roof; pulling the pull tab on the second release liner; releasing the second release liner from the membrane body in response to pulling the pull tab on the second release liner; exposing adhesive below a second portion of the second surface of the membrane body; and applying the second portion of the second surface of the membrane body to the roof.

This exemplary method or another exemplary embodiment of a method may further include the steps of: pulling the first side edge of the first release liner from an alignment that is aligned directly vertical with the tab edge such that the first side edge of the first release liner and the tab edge are the same distance from the first side of the membrane body; or pulling the first side edge of the first release liner from an alignment that overhangs the tab edge such that the first side edge of the first release liner is closer to the first side of the membrane body than the tab edge; or pulling the first side edge of the first release liner from an alignment that is underhung relative to the tab edge such that the first side edge of the first release liner is further from the first side of the membrane body than the tab edge.

This exemplary method or another exemplary embodiment of a method may further include the step of causing the pull tab to move from a folded position to an extended position when the first release liner is removed from the split seam via a living hinge defined by the longitudinally-aligned fold, wherein the resilient material biases the pull tab to move from the folded position to the extended position.

BRIEF DESCRIPTION OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figures 1, 3:
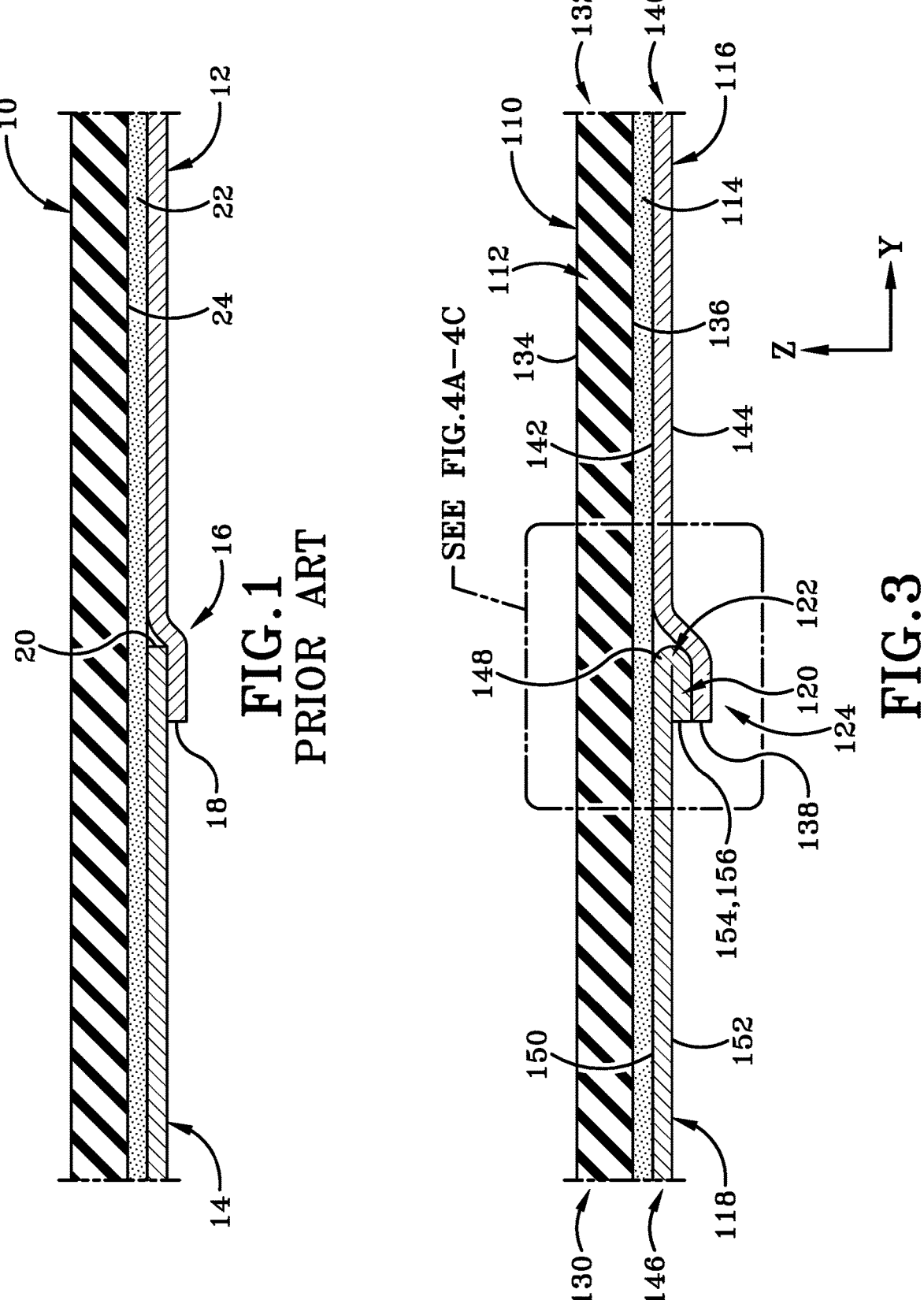
FIG. 1 is a cross section view of a PRIOR ART roof membrane having two release liners defining a split seam.
FIG. 3 is a cross section view taken along line 3-3 in FIG. 2 depicting the roof membrane of the present disclosure.
Figure 2:
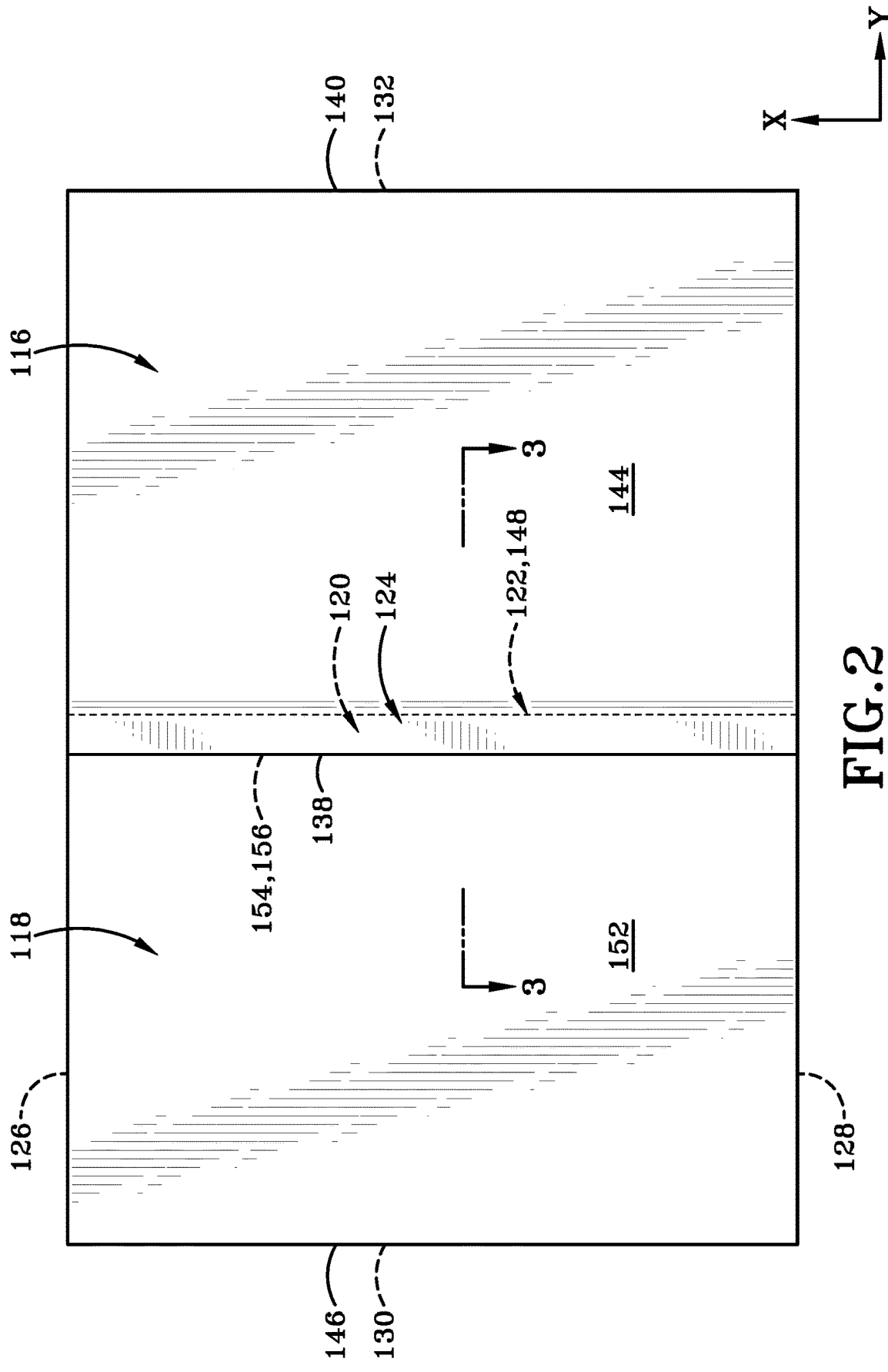
FIG. 2 is a partial bottom plan view of a roof membrane according to various aspects of the present disclosure.

In addition to the PRIOR ART identified in U.S. Pat. No. 6,464,281, FIG. 1 depicts another type of PRIOR ART roof membrane 10 having two release liners 12, 14 defining a split seam 16 by overlapping respective inner ends of the two liners 12, 14. Notably, a first side edge 18 of first release liner 12 overlaps a second side edge 20 of the second release liner 14. The first side edge 18 of the first release liner 12 does not contact the adhesive which allows the first release liner 12 to be easily removed or peeled away from the adhesive 22 on the second side 24 (i.e., the underside surface or bottom surface) of the membrane 10. However, the entire body of the second release liner 14 is applied to the second side 24 of the membrane 10. It is difficult for an operator, applicator or construction worker to remove the second release liner 14 from the adhesive 22 on the second side 24 (i.e., the underside surface or bottom surface) of the membrane 10 since the entirety of the second release liner 14 is connected to the adhesive 22. The present disclosure addresses the deficiency in the prior art that causes difficulty for removing the second release liner 14.

FIG. 2-FIG. 8 depict a roof membrane 110 according to various aspect of the present disclosure. The roof membrane comprises a membrane body 112, an adhesive 114, a first release liner 116, a second release liner 118 with a pull tab 120 on the second release liner 118 that is defined by a longitudinally-aligned fold 122 at the second side edge of the second release liner 118, and a split seam 124 defined at an overlap of the first release liner 116 and the second release liner 118.

The membrane body 112 is substantially fluid impermeable to prevent fluid from penetrating through the membrane 110 and the membrane body 112. This is beneficial as the membrane body 112 is a roof membrane that is to be applied to a roof 300 (FIG. 8) as a fluid barrier. The membrane body 112 has a first end 126 and a second end 128 defining a longitudinal direction X therebetween. The membrane body 112 has a first side 130 and a second side 132 defining a transverse direction Y therebetween. The membrane body 112 has a major first surface 134 (i.e., a top surface or an upper surface) and a major second surface 136 (i.e. a bottom surface or a lower surface) defining a vertical direction Z therebetween. The longitudinal direction X, transverse direction Y and vertical direction Z are orthogonal to each other that is common to cardinal coordinates or cardinal directions.

The adhesive 114 is applied to the major second surface 136 of the membrane body 112. The adhesive 114 is configured to attach the membrane 110 to the roof 300 when the release liners 116, 118 have been peeled away or otherwise removed. The adhesive 114 utilized is a strong construction adhesive that effectuates a near permanent bond between the roof 300 and the membrane body 112.

The first release liner 116 may be formed from a material that is common to other release liners in the construction industry and may be coated with an anti-stick or non-stick material to effectuate the release of the first release liner 116 from the adhesive 114 when desired and the membrane 110 is to be installed on roof 300.

The first release liner 116 has a first side edge 138 and a second side edge 140. The width of the first release liner 116 is measured in the transverse direction Y from the first side edge 138 to the second side edge 140. The width of the first release liner 116 is less than that of the total width of the membrane body 112. The first release liner 116 has a first surface 142 (i.e., a top surface or upper surface) and a second surface 144 (i.e. a bottom surface or a lower surface). The first surface 142 of the first release liner 116 is releasably attached to the adhesive 114 on the major second surface 136 of the membrane body 112.

The second release liner 118 may be formed from a material that is common to other release liners in the construction industry and may be coated with an anti-stick or non-stick material to effectuate the release of the second release liner 118 from the adhesive 114 when desired and the membrane is to be installed on roof 300.

The second release liner 118 has a first side edge 146 and a second side edge 148. Second side edge 148 may be defined by fold 122. The width of the second release liner 118 is measured in the transverse direction Y from the first side edge 146 to the second side edge 148. The width of the second release liner 1108 is less than that of total width the membrane body 112. The second release liner 118 has a first surface 150 and a second surface 152. The first surface 150 of the second release liner 118 is releasably attached to the adhesive 114 on the major second surface 136 of the membrane body 112.

One exemplary embodiment includes pull tab 120 on the on second release liner 118. However, other embodiments may include a different structure other than pull tab 120. In one embodiment, the pull tab 120 is integrally formed with the second release liner 118. Stated otherwise, the pull tab 120 may for formed from the same material and be a continuous or congruent feature of the second release liner 118 and is not a distinct/separate component, such as what is taught in U.S. Pat. No. 6,464,821.

The pull tab 120 may be defined by the longitudinally-aligned fold 122 (i.e., parallel to the longitudinal direction X) at the second side edge 148 of the second release liner 118. The pull tab 120 on the second release liner 118 is adapted to be pulled to release the second release liner 118 from the membrane body 112.

The pull tab 120 extends longitudinally parallel to the longitudinal direction X from the first end 126 to the second end 128 of the membrane body 112. The pull tab 120 terminates at a terminal end 154. The terminal end 154 is parallel to the second side edge 148 of the second release liner 118 and parallel to the first side edge 138 of the first release liner 116 and perpendicular to the first and second ends 126, 128 of the membrane body 112. The pull tab 120 is substantially rectangular when viewed from below (See FIG. 2).

The pull tab 120 has a width that is measured in the transverse direction Y from the terminal end 154 of the pull tab 120 to the second side edge 148 of the second release liner 148 and the width of the pull tab is in a range from about ½ inch to about 4 inches. In one exemplary embodiment, there may be criticality in the width of pull tab 120 within this range that assists in the removal of the second release liner 118 due to the nature of the operator or applicator often wearing heavy workman gloves while installing the membrane on a roof. The terminal end 154 of the pull tab 120 is defined by a tab edge 156 that extends longitudinally from the first end 126 of the membrane body 112 to the second end 128 of the membrane body 112.

The split seam 124 is defined at an overlap of the first side edge 138 of the first release liner 116 and the second side edge 148 of second release liner 118, wherein at least a portion of the first release liner 116 overlaps the pull tab 120.

Figure 4A:
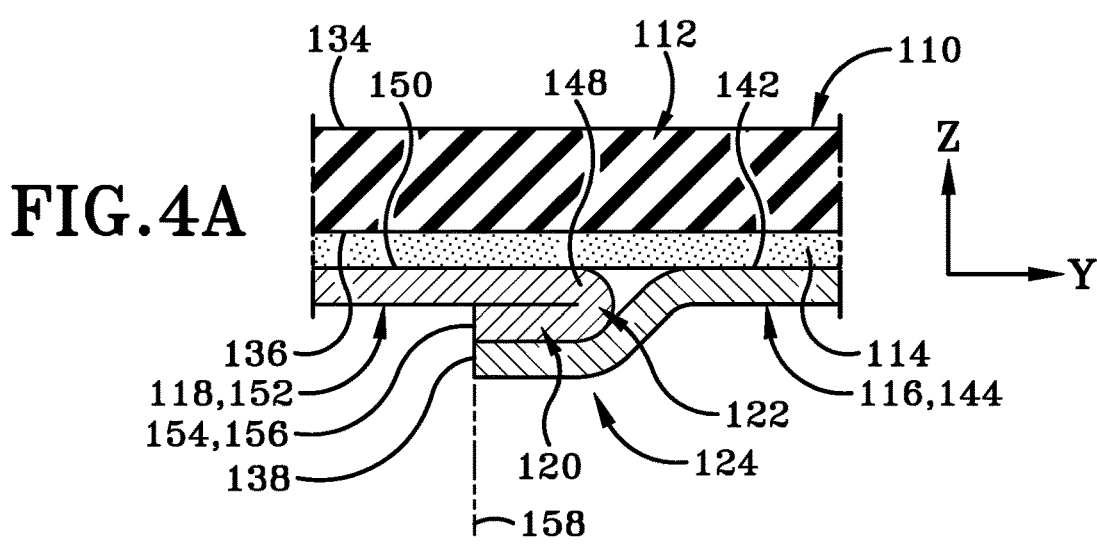
FIG. 4A is an enlarged cross section view of the region labeled "SEE FIG. 4A-4C" in FIG. 3 that depicts one exemplary configuration of the overlap at the split seam.
Figure 4B:
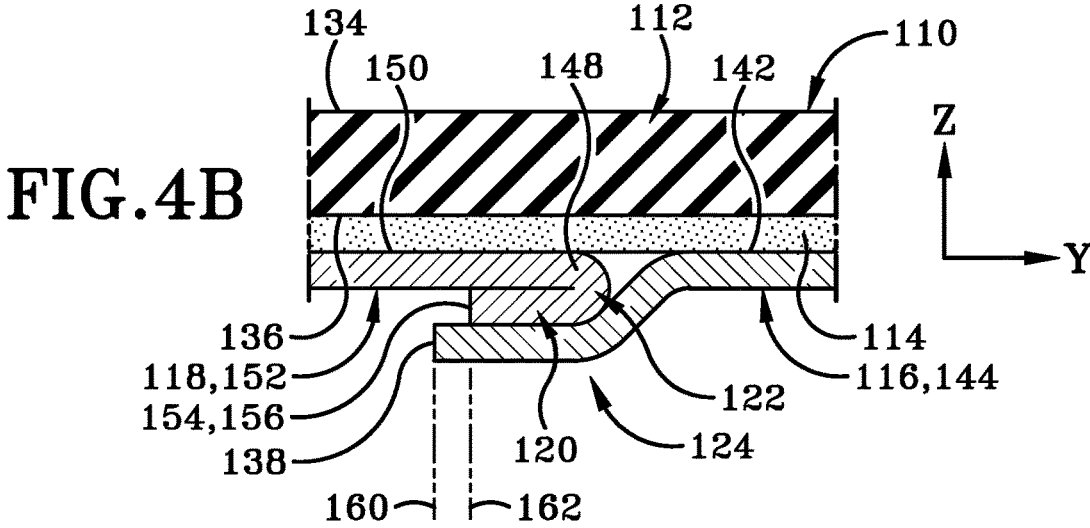
FIG. 4B is an enlarged cross section view of the region labeled "SEE FIG. 4A-4C" in FIG. 3 that depicts another exemplary configuration of the overlap at the split seam.
Figure 4C:
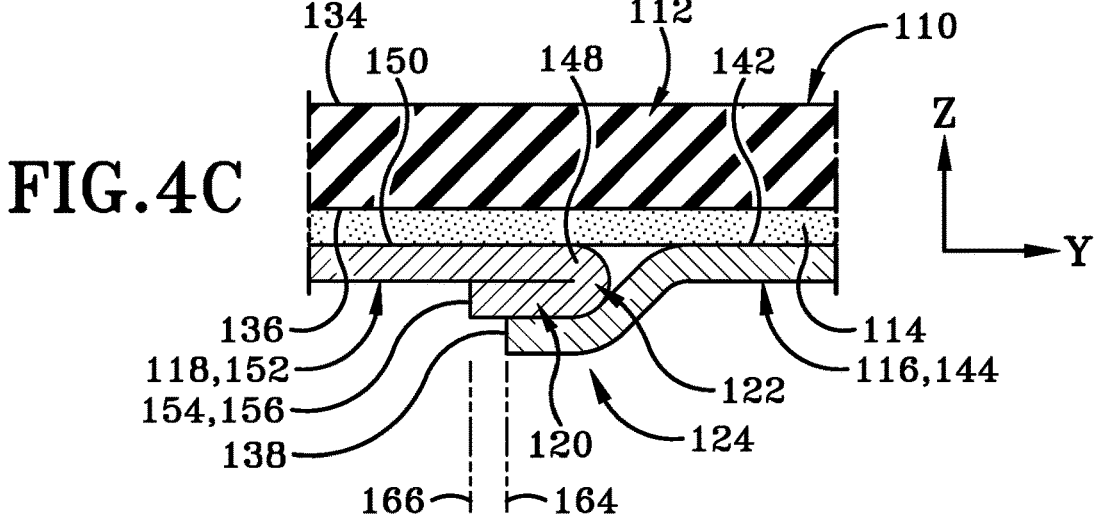
FIG. 4C is an enlarged cross section view of the region labeled "SEE FIG. 4A-4C" in FIG. 3 that depicts yet another exemplary configuration of the overlap at the split seam.

FIG. 4A-FIG. 4C depict different types of "overlaps" at the split seam 124. The overlap can be aligned (FIG. 4A), overhang (FIG. 4B), or underhung (FIG. 4C), any of which could be beneficial depending on the application specific needs, installation requirements, or ease of manufacture.

FIG. 4A depicts one embodiment of the present disclosure in which the first side edge 138 of the first release liner 116 is aligned directly vertical with the tab edge 156 such that the first side edge 138 of the first release liner 116 and the tab edge 156 are the same distance from the first side 130 of the membrane body 112. Stated otherwise, the first side edge 138 of the first release liner 116 and the terminal end 154, which is defined by the tab edge 156, of the pull tab 120 are coplanar along a single vertical plane 158.

FIG. 4B depicts another embodiment of the present disclosure in which the first side edge 138 of the first release liner 116 overhangs the tab edge 156 such that the first side edge 138 of the first release liner 116 is closer to the first side 130 of the membrane body 112 than the tab edge 156. Stated otherwise, the first side edge 138 of the first release liner 116 lies along a first vertical plane 160 and the tab edge 156 lies along a second vertical plane 162. The first vertical plane 160 and the second vertical plane 162 are spaced apart and parallel to each other with the first vertical plane 160 being closer the first side 130 of the membrane body 112 than the second vertical plane 162. In this instance, the first vertical plane 160 is also farther from the second side 132 of the membrane body 112 than the second vertical plane 162 (i.e., the second vertical plane 162 is closer to the second side 132 of the membrane body 112). An overhang distance is measured in the transverse direction Y from the first side edge 138 of the first release liner 116 relative to the tab edge 156. Stated otherwise, the overhang distance is the transverse distance defined between the first vertical plane 160 and the second vertical plane 162. The overhang distance is in a range from 1 inch to 3 inches. There may be criticality in the overhand distance within this range that assists in the removal of the first liner 116 from its connection with the membrane body 112 via the adhesive at the split seam 124.

FIG. 4C depicts another embodiment of the present disclosure in which the first side edge 138 of the first release liner 116 is underhung relative to the tab edge 156 such that the first side edge 138 of the first release liner 116 is farther from the first side 130 of the membrane body 112 than the tab edge 156. Stated otherwise, the first side edge 138 of the first release liner 116 lies along a first vertical plane 164 and the tab edge 156 lies along a second vertical plane 166. The first vertical plane 164 and the second vertical plane 166 are spaced apart and parallel to each other with the first vertical plane 164 being farther the first side 130 of the membrane body 112 than the second vertical plane 166. In this instance, the first vertical plane 164 is also closer to the second side 132 of the membrane body 112 than the second vertical plane 166 (i.e., the second vertical plane is farther from the second side of the membrane body). An underhung distance is measured in the transverse direction Y from the first side edge 138 of the first release liner 116 relative to the tab edge 156. Stated otherwise, the underhung distance is the distance defined between the first vertical plane 164 and the second vertical plane 166. The underhung distance is in a range from 1 inch to 3 inches. There may be criticality in the overhand distance within this range that assists in the removal of the first liner 116 from its connection with the membrane body via the adhesive at the split seam while allowing the pull tab 120 to be slightly exposed and viewable from below to assist with visibility and identification thereof.

Figures 5, 6:
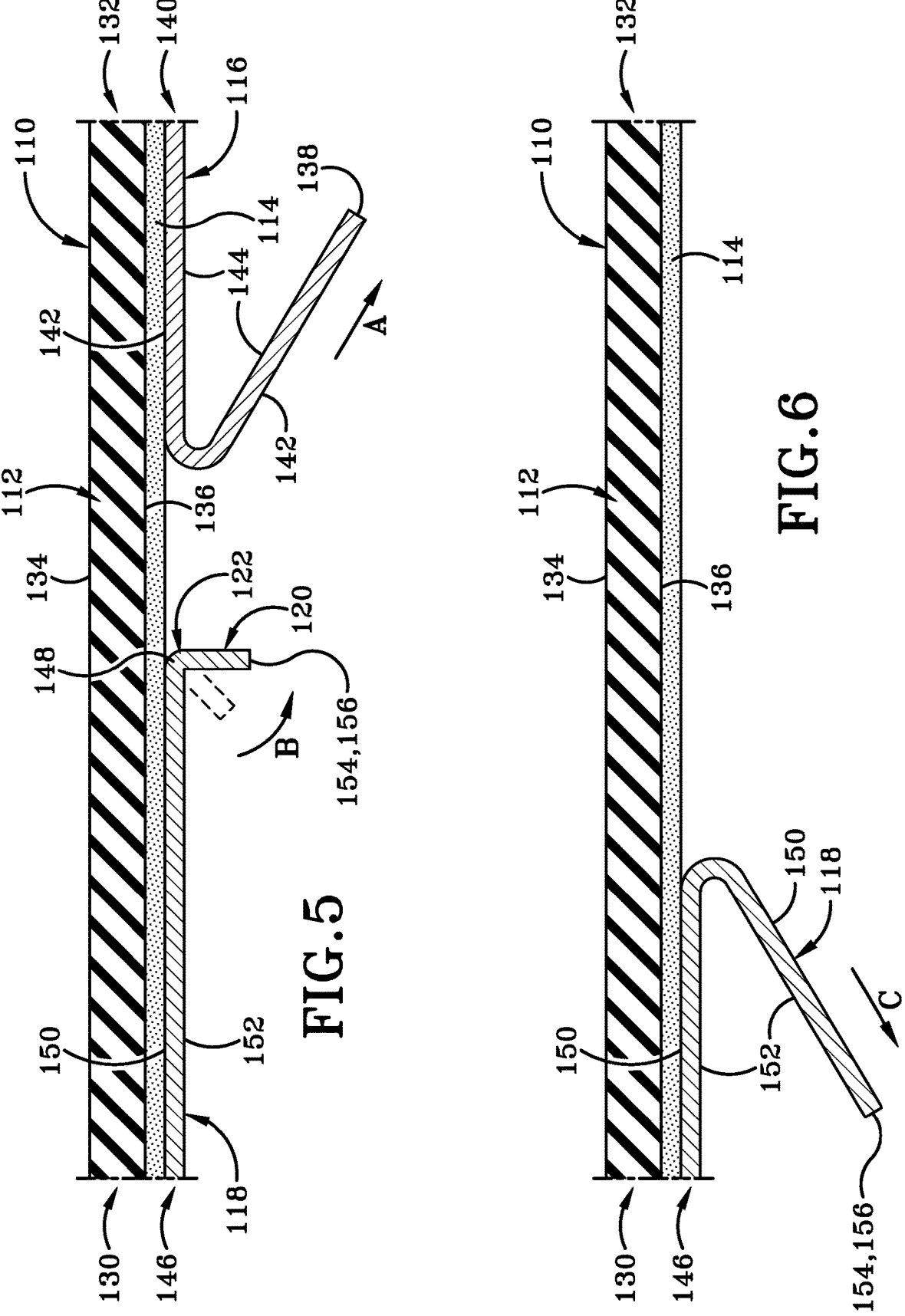
FIG. 5 is an operational cross section view depicting the removal of the first release liner and a pull tab moving to an extended position.
FIG. 6 is an operational cross section view depicting the removal of the second release liner in response to pulling the pull tab.

The longitudinally aligned fold 122 that forms the pull tab 120 may be in the form of a living hinge. A living hinge or integral hinge is a thin flexible hinge (flexure bearing) made from the same material as the two pieces it connects (i.e., the primary portion of the second release liner and the pull tab). It is typically thinned or cut to allow the pieces to bend along the line of the hinge, which in this instance is defined by the longitudinally-aligned fold. The minimal friction and very little wear in such a hinge makes it useful in the design of the present disclosure, and the low cost and ease of manufacturing makes it suitable for the present disclosure. As such, the material forming the second release liner 118 may be a resilient material that biases the pull tab 120 from a folded position (FIG. 3) to an extended position (FIG. 5) when the first release liner 116 is removed from the split seam 124, as indicated by Arrow A. More particularly, the living hinge permits the pull tab 120 to bias itself under its own internal forces from the folded position to the extended position, as indicated by Arrow B, once the first release liner 116 is removed. Particularly, when the pull tab 120 is in the folded position, the width of the pull tab 120 is substantially parallel to the major second surface 136 of the membrane body 112. However, when the pull tab 120 biases itself to the extended position, the width of the pull tab 120 is not parallel to the major second surface 136 of the membrane body 112. In one embodiment, the extended position of the pull tab 120 may be associated with a position in which the width of the pull tab is approximately perpendicular to the major second surface 136 of the membrane body 112 (as shown in FIG. 5). However, a perpendicular relationship is not required. The living hinge may bias the pull tab slightly downward from the folded position at any angle between parallel and perpendicular to assist user or applicator to grasp the pull tab. For example, the living hinge can bias the width of the pull tab 120 about 10°-60° downward from horizontal and still provide a useful space for the operator or applicator to grasp the pull tab. Thereafter, the operator or applicator grasps the pull tab 120 and removes the second release liner 118, as indicated by Arrow C (See FIG. 6).

Alternative to the fold 122 being formed as a living hinge, another exemplary embodiment provides the fold 122 as a dead-fold. A dead-fold would be one that lays flat (i.e., parallel to the major second surface 136) and does not move from the folded position to the extended position. In one particular embodiment, the dead-fold is accomplished through a mechanical folding process during the manufacturer of the membrane 110 when the first and second release liners 116, 118 are applied to the adhesive 114. The material used to form the second release liner 118 with a dead-fold would be a material that does not bias the pull tab to an extended position when the first release liner 116 is removed.

In one particular embodiment, the method of manufacturing the fold 122, regardless of whether the fold is a living hinge or a dead-fold, may be accomplished via a plow pan or a folding platform that is subsequently rolled to create the fold 122. Another option for creating fold 122 would be via a machinery that has a nip to create the fold 122.

The split release liner having the pull-tab 120 defined by fold 122 is applicable to other industries aside from roof membranes. For example, a split release liner having pull-tab 120 defined by fold 122 could be applied to other large membranes such as vinyl wraps or vinyl vehicle wraps, other stickers, or other adhesively backed membranes, regardless of whether these other membranes are configured to be waterproof or vapor barriers.

One exemplary advantage of the pull-tab 120 defined by fold 122 is that the applicator or operator that applies the membrane 110 to roof 300 is outdoors and subject to the environments. Typically, these operators or applicators wear gloves the due to the strong adhesive 114 on the second surface 136 of body 112. The pull tab provides an advantage when it has the widths disclosed herein to function with an operator who is wearing gloves because it is wide enough to allow a thick workman's glove to grasp the pull-tab 120 but still be small enough so it's not interfere with the split seam 124.

Figure 7:
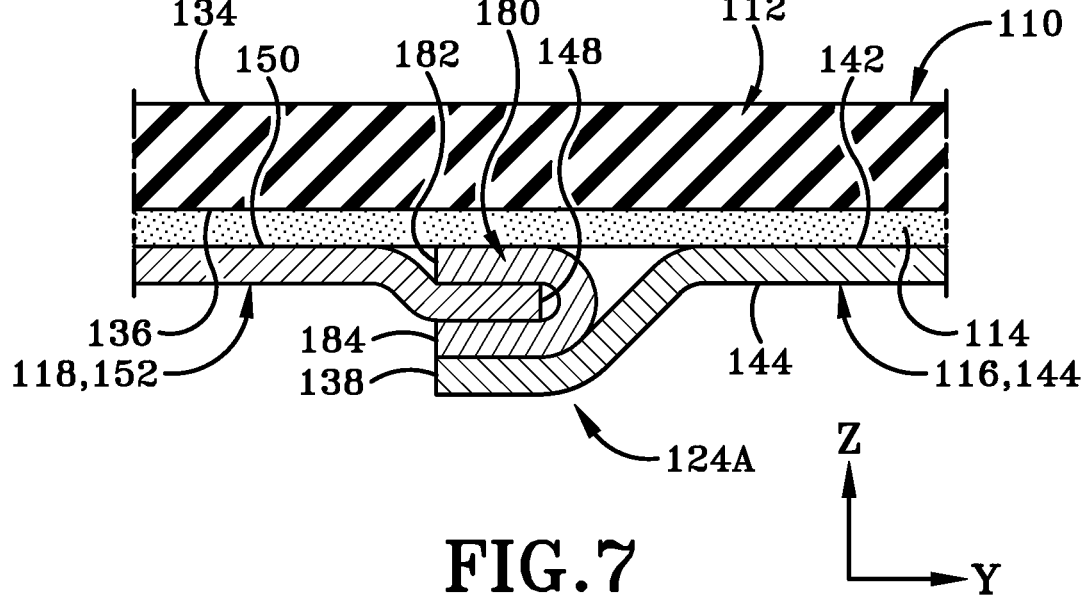
FIG. 7 is an enlarged cross section view of alternative embodiment of a split seam that includes a folded strip of material that surrounds the second side of the second release liner.

FIG. 7 depicts an alternative embodiment of the present disclosure has a split seam 124A, which may be simply referred to as a folded strip 180 that spans around the second end 148 of the second release liner 118. The folded strip 180 extends between a first end 182 and a second end 184. The first end 182 is interposed between the second release liner 118 and adhesive 114. The second end 184 is interposed between the second surface 152 of second release liner 118 and the first surface 142 of the first release 116. Thus, when the first release liner 116 is removed, the folded strip 180 may be utilized such that the second end 184 acts as a pull-tab in which an operator may pull the second end 184 to lift up the second-end 148 of the second release the release liner 118 to thereby remove the release liner 118 from its contact with adhesive 114 on the second surface 136 of body 112. When viewed in cross-section the folded strip 180 is substantially c-shaped or has a c-shaped configuration, however other configurations are possible. For example, instead of the markers being the strip 180 being C-shaped in cross section, the strip 180 can be, when viewed in cross section, triangular, rectangular or square, pentagonal, hexagonal, heptagonal, octagonal, decagonal, dodecagonal, diamond shaped or another parallelogram, trapezoidal, star-shaped, oval, ovoid, lines or lined, teardrop-shaped, cross-shaped, donut-shaped, heart-shaped, arrow-shaped, crescent-shaped, any letter shape (i.e., A-shaped, B-shaped, C-shaped, D-shaped, E-shaped, F-shaped, G-shaped, H-shaped, I-shaped, J-shaped, K-shaped, L-shaped, M-shaped, N-shaped, O-shaped, P-shaped, Q-shaped, R-shaped, S-shaped, T-shaped, U-shaped, V-shaped, W-shaped, X-shaped, Y-shaped, or Z-shaped), or any other type of regular or irregular, symmetrical or asymmetrical configuration.

Figure 8:
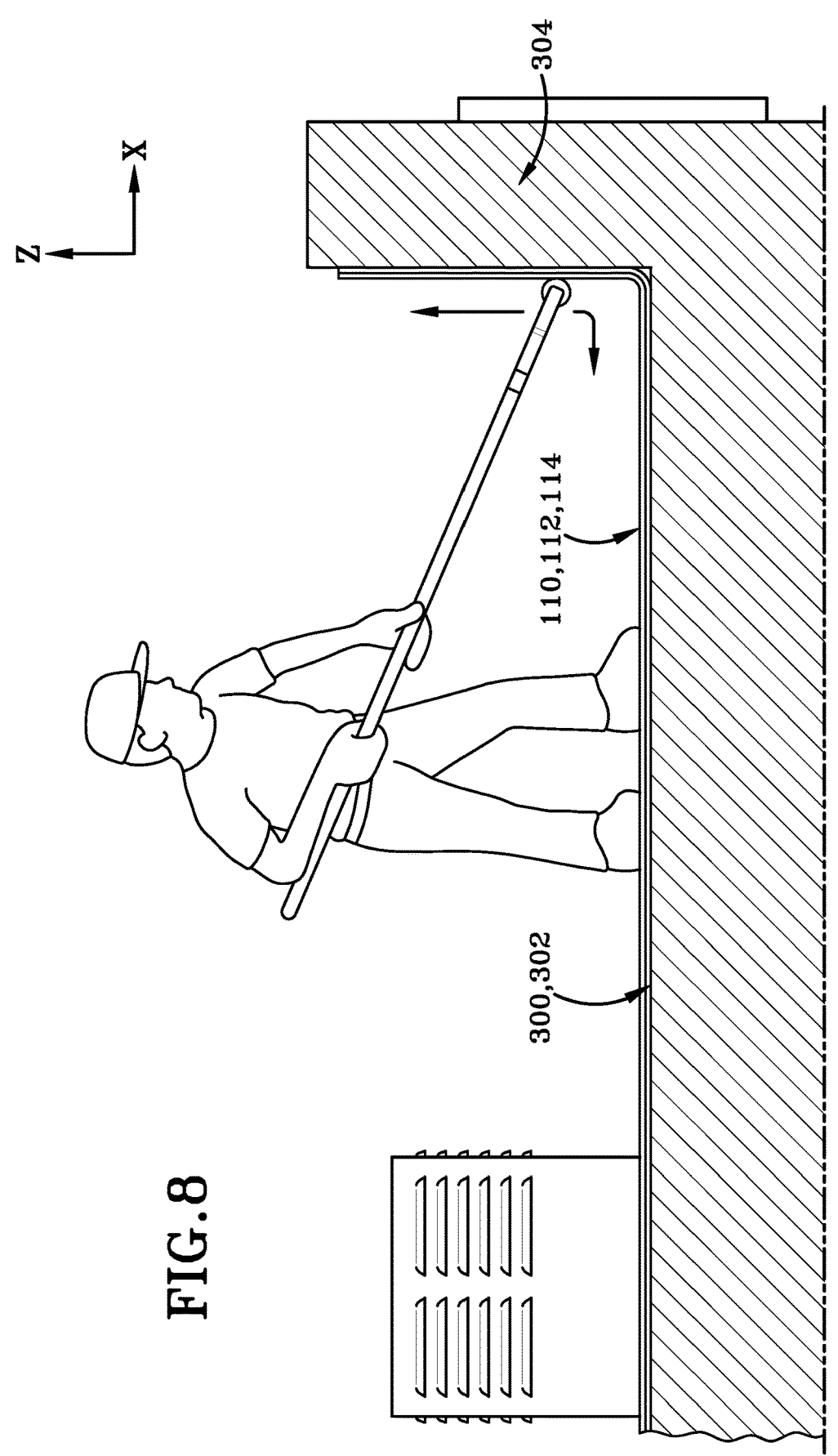
FIG. 8 is a diagrammatic operational view of the application of a roof membrane to a roof.

FIG. 8 depicts an operator or applicator using a tool or rolling device that is configured to be maneuvered by hand by the operator or applicator to apply membrane 110 to either the roof 300 or a vertical wall on a building. The membrane 110 is a waterproof material or vapor membrane that prevents fluid from penetrating the roof 300 or the foundation walls of a building. The membrane may be a single layer of material, or may be multi-layered. The roof 300 includes a horizontal portion 302 that is substantially parallel to the foundation of the building. There may be a vertical wall 304 extending around at least a portion of the perimeter of the roof 300 is substantially orthogonal to the foundational plane or horizontal portion 302 of the building. The membrane 110 extends horizontally along the horizontal portion 302 of the roof 300 and may optionally extend upwardly along the vertical wall 304 to define an upper extension of the membrane 110. The upper extension and the horizontal portion of the membrane 110 define a rounded corner that is configured to be impenetrable by fluid. There is no minimum or maximum height associated with wall 304. For example, it is common for some vertical walls on the roof 300 of a building to be greater than ten feet high.

An operator or applicator typically applies the membrane 110 to roof by first obtaining the roof membrane 110 described herein. Then, the operator or applicator performs the step of releasing the first release liner 116 from the membrane body 112 in response to pulling the first side edge 138 of the first release liner 116. Then, exposing adhesive 114 below a first portion of the second surface 136 of the membrane body 112. Then, applying the first portion of the second surface 136 of the membrane body 112 to roof 300. The application of the first portion of the second surface 136 of the membrane body 112 to the roof 300 may be accomplished by hand or with the assistance of the rolling device, such as what is shown in FIG. 8. Then, the operator pulls the pull tab 120 on the second release liner 118, as shown in FIG. 6. Then, releasing the second release liner 118 from the membrane body 112 in response to pulling the pull tab 120 on the second release liner 118. Then, exposing adhesive 114 below a second portion of the second surface 136 of the membrane body 112. Then, applying the second portion of the second surface 136 of the membrane body 112 to the roof 300. The application of the second portion of the second surface 136 of the membrane body 112 to the roof 300 may be accomplished by hand or with the assistance of the rolling device.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of,"

"only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A roof membrane comprising:

a roof membrane body that is vapor and fluid impermeable to prevent vapor and fluid from penetrating through the roof membrane body when the roof membrane body is applied to a surface on a roof, wherein the roof membrane body has a first end and a second end defining a longitudinal direction therebetween, a first side and a second side defining a transverse direction therebetween, a first surface and a second surface defining a vertical direction therebetween;

a construction adhesive applied to the second surface of the roof membrane body, wherein the construction adhesive effectuates a near permanent bond between the surface on the roof and the roof membrane body when the roof membrane body is applied to the surface on the roof;

a first release liner having a first side edge and a second side edge, wherein the width of the first release liner is less than that of the roof membrane body, the first release liner having a first surface and a second surface, wherein the first surface of the first release liner is releasably attached to the construction adhesive on the second surface of the roof membrane body;

a second release liner having a first side edge and a second side edge, wherein the width of the second release liner is less than that of the roof membrane body, the second release liner having a first surface and a second surface, wherein the first surface of the second release liner is releasably attached to the construction adhesive on the second surface of the roof membrane body;

a pull tab defined by a longitudinally-aligned fold, wherein the pull tab is integrally formed at the second side edge of the second release liner and the pull tab and the second release liner being formed from a single, continuous piece of material, wherein the pull tab that is integrally formed with the second release liner is adapted to be pulled to release the second release liner from the roof membrane body, wherein the pull tab is substantially rectangular when viewed from below, wherein the pull tab extends longitudinally from the first end to the second end of the roof membrane body and the pull tab terminates at a terminal end, wherein the terminal end of the pull tab is defined by a tab edge that extends longitudinally from the first end of the roof membrane body to the second end of the roof membrane body, wherein a width of the pull tab is measured from the terminal end of the pull tab to the second side edge of the second release liner and the width of the pull tab is in a range from about ½ inch to about 4 inches;

a split seam defined at an overlap of the first side edge of the first release liner and the second side edge of second release liner, wherein at least a portion of the first release liner overlaps the pull tab; and wherein the first side edge of the first release liner is aligned directly vertical with the tab edge such that the first side edge of the first release liner and the tab edge are the same distance from the first side of the roof membrane body.

2. A roof membrane comprising:

a roof membrane body that is vapor and fluid impermeable to prevent vapor and fluid from penetrating through the roof membrane body when the roof membrane body is applied to a surface on a roof, wherein the roof membrane body has a first end and a second end defining a longitudinal direction therebetween, a first side and a second side defining a transverse direction therebetween, a first surface and a second surface defining a vertical direction therebetween;

a construction adhesive applied to the second surface of the roof membrane body, wherein the construction adhesive effectuates a near permanent bond between the surface on the roof and the roof membrane body when the roof membrane body is applied to the surface on the roof;

a first release liner having a first side edge and a second side edge, wherein the width of the first release liner is less than that of the roof membrane body, the first release liner having a first surface and a second surface, wherein the first surface of the first release liner is releasably attached to the construction adhesive on the second surface of the roof membrane body;

a second release liner having a first side edge and a second side edge, wherein the width of the second release liner is less than that of the roof membrane body, the second release liner having a first surface and a second surface, wherein the first surface of the second release liner is releasably attached to the construction adhesive on the second surface of the roof membrane body;

a pull tab defined by a longitudinally-aligned fold, wherein the pull tab is integrally formed at the second side edge of the second release liner and the pull tab and the second release liner being formed from a single, continuous piece of material, wherein the pull tab that is integrally formed with the second release liner is adapted to be pulled to release the second release liner from the roof membrane body, wherein the pull tab is substantially rectangular when viewed from below, wherein the pull tab extends longitudinally from the first end to the second end of the roof membrane body and the pull tab terminates at a terminal end, wherein the terminal end of the pull tab is defined by a tab edge that extends longitudinally from the first end of the roof membrane body to the second end of the roof membrane body, wherein a width of the pull tab is measured from the tab edge of the pull tab to the second side edge of the second release liner and the width of the pull tab is in a range from about ½ inch to about 4 inches;

a split seam defined at an overlap of the first side edge of the first release liner and the second side edge of second release liner, wherein at least a portion of the first release liner overlaps the pull tab; and wherein the first side edge of the first release liner overhangs the tab edge such that the first side edge of the first release liner is closer to the first side of the roof membrane body than the tab edge, and an overhang distance that is measured in the transverse direction from the first side edge of the first release liner to the tab edge, wherein the overhang distance is in a range from 1 inch to 3 inches.

3. The roof membrane of claim 2, wherein the tab edge is parallel to the second side edge of the second release liner and parallel to the first side edge of the first release liner and perpendicular to the first and second ends of the roof membrane body.

4. The roof membrane of claim 2, wherein the second release liner is formed from a resilient material, the roof membrane further comprising:

a living hinge defined by the longitudinally-aligned fold, wherein the resilient material biases the pull tab from a folded position to an extended position when the first release liner is removed from the split seam.

5. The roof membrane of claim 2, wherein the second release liner is formed from a non-resilient material, the roof membrane further comprising:

a dead-fold defined by the longitudinally-aligned fold, wherein the non-resilient material maintains the pull tab in a folded position when the first release liner is removed from the split seam.

6. The roof membrane of claim 2, wherein the first side edge of the first release liner lies along a first vertical plane and the tab edge lies along a second vertical plane.

7. The roof membrane of claim 6, wherein the first vertical plane and the second vertical plane are spaced apart and parallel to each other.

8. The roof membrane of claim 7, wherein the first vertical plane is closer to the second side of the roof membrane body than the second vertical plane.

9. A roof membrane comprising:

a roof membrane body that is vapor and fluid impermeable to prevent vapor and fluid from penetrating through the roof membrane body when the roof membrane body is applied to a surface on a roof, wherein the roof membrane body has a first end and a second end defining a longitudinal direction therebetween, a first side and a second side defining a transverse direction therebetween, a first surface and a second surface defining a vertical direction therebetween;

a construction adhesive applied to the second surface of the roof membrane body, wherein the construction adhesive effectuates a near permanent bond between the surface on the roof and the roof membrane body when the roof membrane body is applied to the surface on the roof;

a first release liner having a first side edge and a second side edge, wherein the width of the first release liner is less than that of the roof membrane body, the first release liner having a first surface and a second surface, wherein the first surface of the first release liner is releasably attached to the construction adhesive on the second surface of the roof membrane body;

a second release liner having a first side edge and a second side edge, wherein the width of the second release liner is less than that of the roof membrane body, the second release liner having a first surface and a second surface, wherein the first surface of the second release liner is releasably attached to the construction adhesive on the second surface of the roof membrane body;

a pull tab defined by a longitudinally-aligned fold, wherein the pull tab is integrally formed at the second side edge of the second release liner and the pull tab and the second release liner being formed from a single, continuous piece of material, wherein the pull tab that is integrally formed with the second release liner is adapted to be pulled to release the second release liner from the roof membrane body, wherein the pull tab is substantially rectangular when viewed from below, wherein the pull tab extends longitudinally from the first end to the second end of the roof membrane body and the pull tab terminates at a terminal end, wherein the terminal end of the pull tab is defined by a tab edge that extends longitudinally from the first end of the roof membrane body to the second end of the roof membrane body, wherein a width of the pull tab is measured from the terminal end of the pull tab to the second side edge of the second release liner and the width of the pull tab is in a range from about ½ inch to about 4 inches;

a split seam defined at an overlap of the first side edge of the first release liner and the second side edge of second release liner, wherein at least a portion of the first release liner overlaps the pull tab; and wherein the first side edge of the first release liner is underhung relative to the tab edge such that the first side edge of the first release liner is farther from the first side of the roof membrane body than the tab edge, and an underhung distance measured in the transverse direction from the first side edge of the first release liner to the tab edge, wherein the underhung distance is in a range from 1 inch to 3 inches.

10. The roof membrane of claim 9, wherein the first side edge of the first release liner lies along a first vertical plane and the tab edge lies along a second vertical plane.

11. The roof membrane of claim 10, wherein the first vertical plane and the second vertical plane are spaced apart and parallel to each other.

12. The roof membrane of claim 11, wherein the first vertical plane is farther from the first side of the roof membrane body than the second vertical plane.

13. The roof membrane of claim 12, wherein a distance between the first vertical plane and the second vertical plane is in a range from about 1 inch to about 3 inches to enable the pull tab to be slightly exposed and viewable from below that is adapted to assist with visibility and identification thereof.

* * * * *